C. M. PHILLIPS.
PLANTER.
APPLICATION FILED DEC. 29, 1917.
1,282,124.
Patented Oct. 22, 1918.
3 SHEETS—SHEET 1.
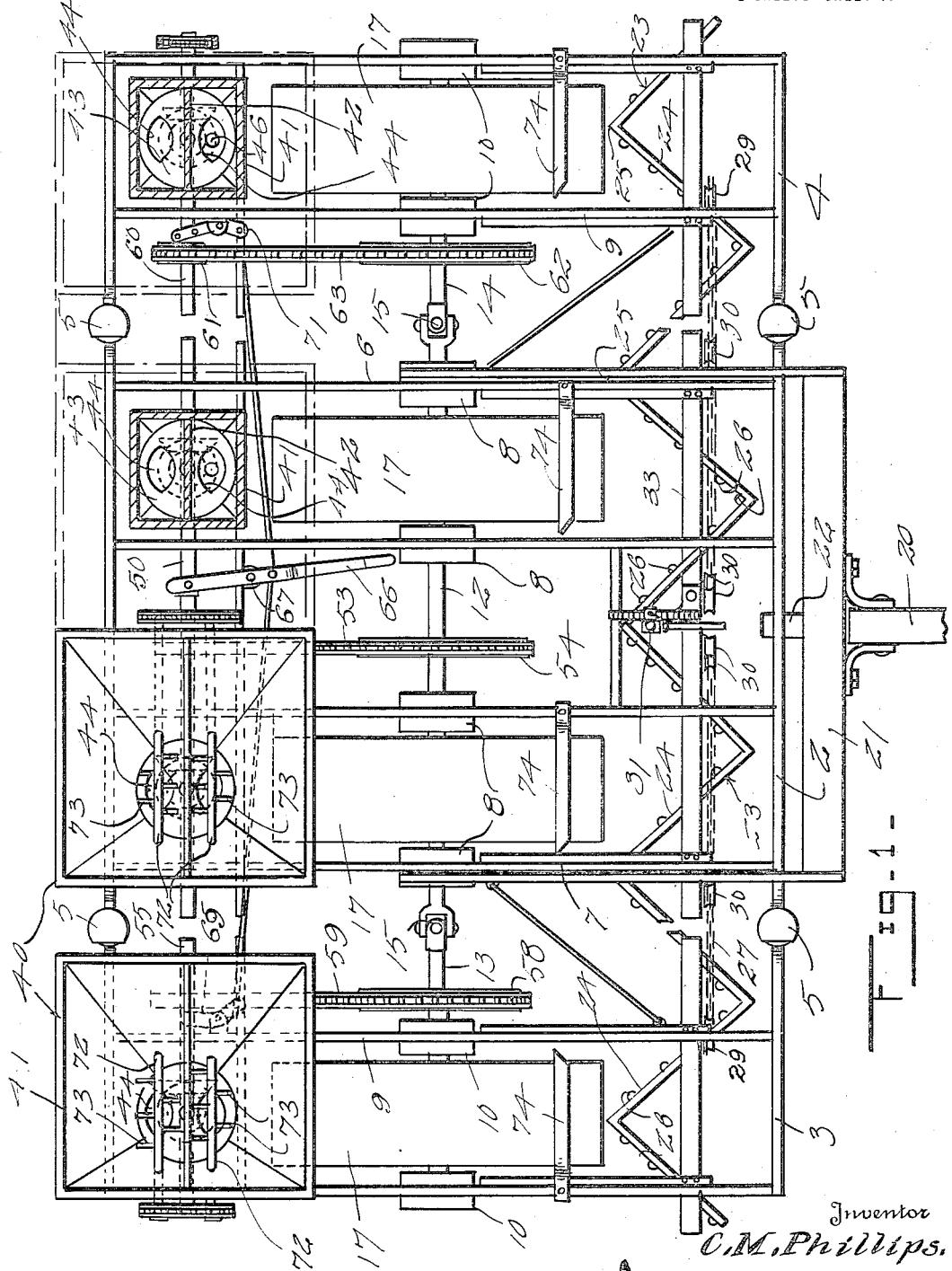
Fig. 1.
Inventor
C. M. Phillips.
Witnesses
By 
Attorney C. M. PHILLIPS.
PLANTER.
APPLICATION FILED DEC. 29, 1917.
1,282,124.
Patented Oct. 22, 1918.
3 SHEETS—SHEET 2.
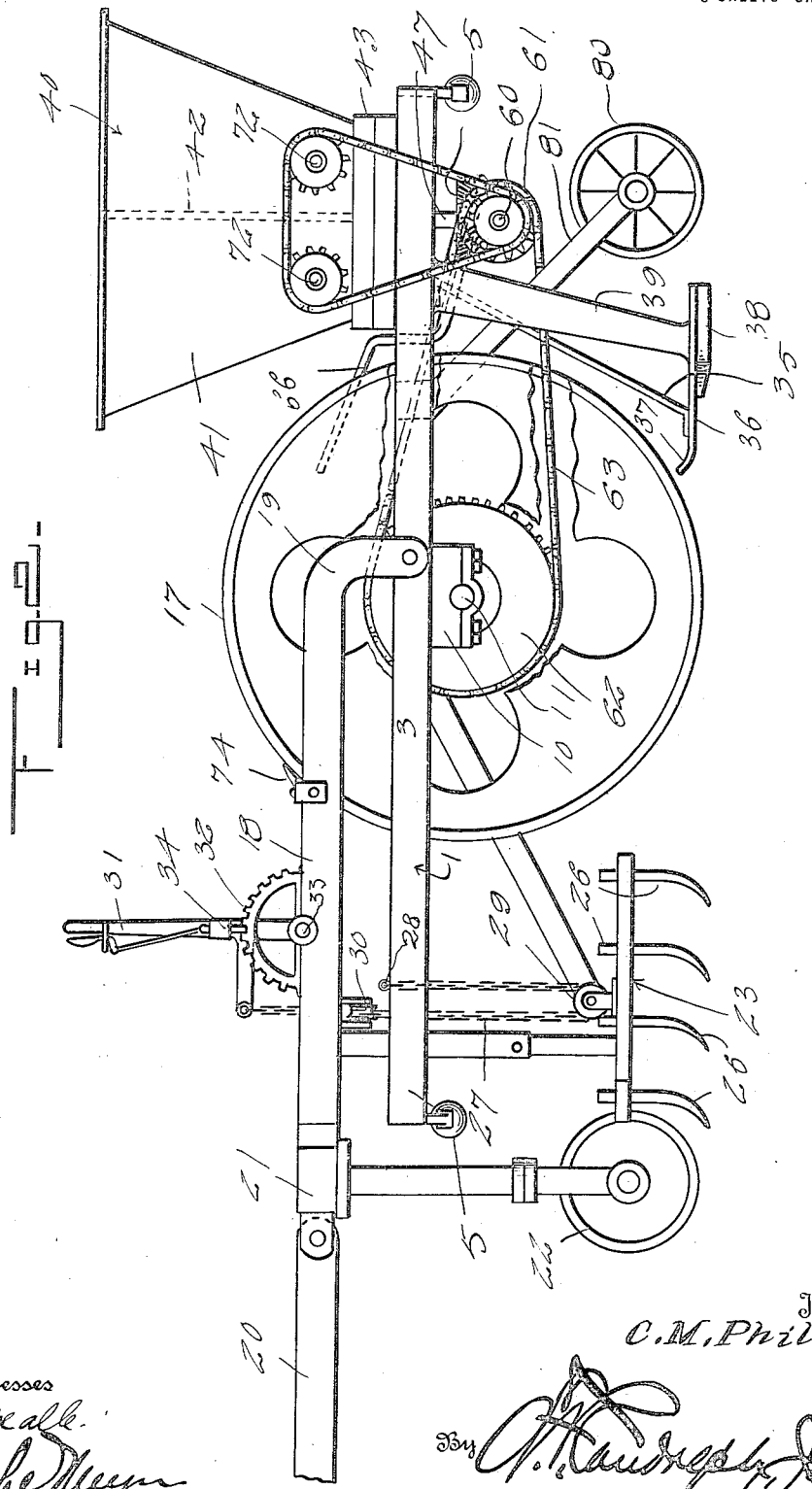
Witnesses
C. M. Beall
Rob? Meyer
Inventor
C. M. Phillips.
By
Attorney

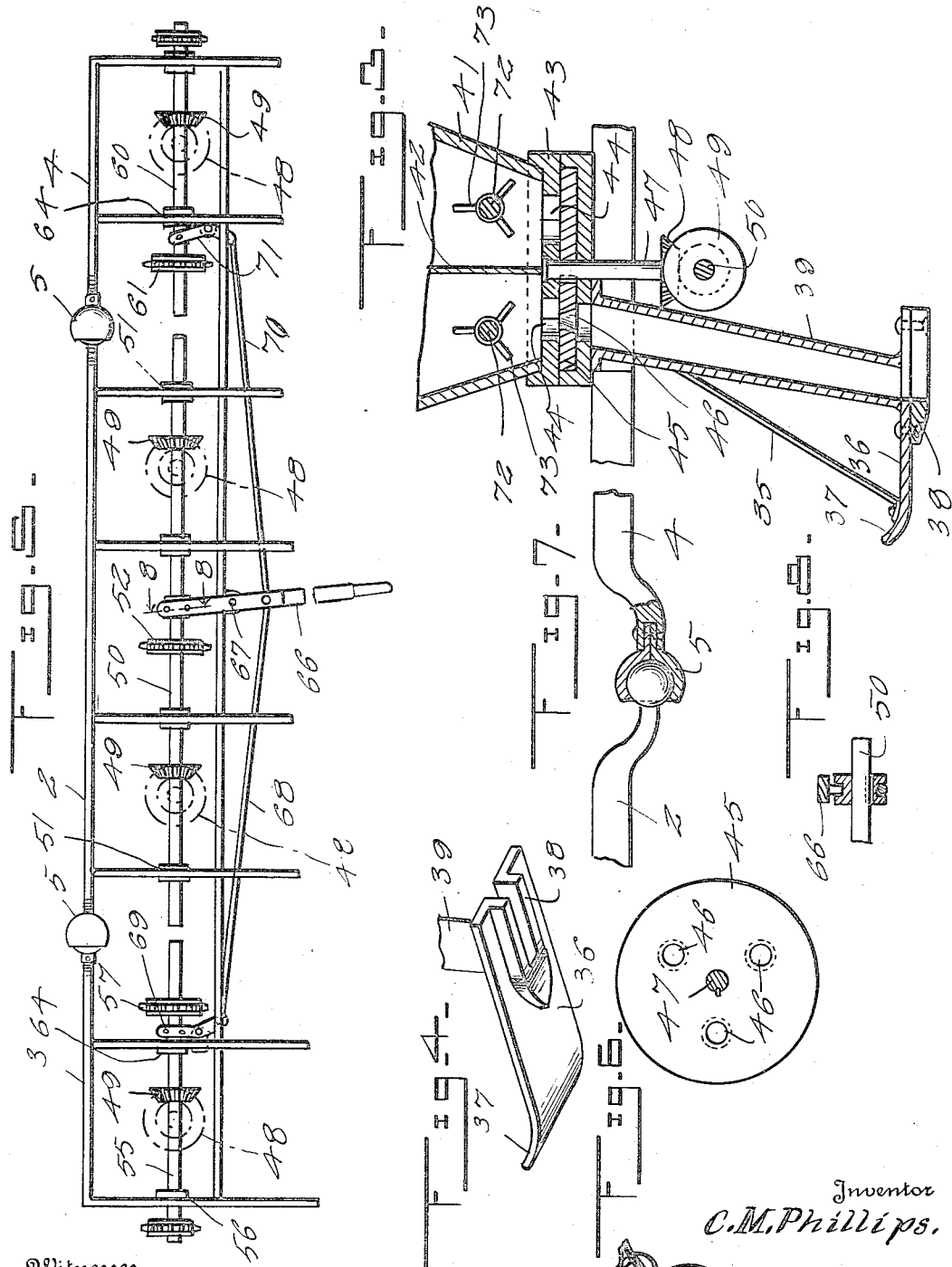

UNITED STATES PATENT OFFICE.

CHARLES M. PHILLIPS, OF ST. LOUIS, MICHIGAN.

PLANTER.

1,282,124.	Specification of Letters Patent.	Patented Oct. 22, 1918.

Application filed December 29, 1917. Serial No. 209,504.

*To all whom it may concern:*

Be it known that I, CHARLES M. PHILLIPS, a citizen of the United States, residing at St. Louis, in the county of Gratiot and State of Michigan, have invented certain new and useful Improvements in Planters; and I do hereby declare the following to be a full, clear, and exact description of the invention, such as will enable others skilled in the art to which it appertains to make and use the same.

This invention relates to planters particularly designed for sugar beet seed and the primary object of the invention is to provide a planter which will form a very shallow furrow, substantially three-quarters of an inch deep for planting all of the seed at the same depth to insure uniform growing thereof and further to provide a planter structure which will deposit the seed in spaced hills so as to eliminate what is commonly known as "blocking" the beets after they have started growing.

A further object of this invention is to provide a planter as specified which will plant four rows of seeds at a time, and to construct the frame work of the planter so that the planting structure positioned at each end or side thereof may move pivotally within certain limits, independently of the movement of the central or intermediate planting structure so as to allow uniform planting upon uneven ground.

Another object of this invention is to provide a harrow or land leveling structure which is carried by the planter at the forward end of the same and also land rollers which are positioned directly in front of the furrow opening shoes whereby the land will be leveled and rolled to provide a seed bed prior to the planting of the seed therein which will eliminate the necessity of re-harrowing the land to be planted in case it was prepared for planting and afterward rained upon prior to the planting.

Another object of this invention is to provide a planter structure wherein the draft tongue is connected to the supporting frame of the planter directly in the rear of the main supporting axle of the planter, to cause an equal distribution of the draft and permit the planter to rock when traveling over undulations of the ground.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:

Figure 1 is a top plan view of the planter.

Fig. 2 is a side elevation of the planter.

Fig. 3 is a vertical section through the rear end of the planter showing the hopper structure and the seed dispensing mechanism.

Fig. 4 is a detail perspective view of the shoe and furrow opener.

Fig. 5 is an enlarged detail view of the gear shift structure for controlling the operation of the dispensing structure.

Fig. 6. is a plan of the seed dispensing plate.

Fig. 7 is a detail section of a part of the frame structure.

Fig. 8 is a section on the line 8—8 of Fig. 5.

Referring more particularly to the drawings, 1 designates the supporting frame of the planter as an entirety, which frame is constructed of angled iron and to form an intermediate section 2 and side sections 3 and 4. The side sections 3 and 4 are connected by means of ball and socket joints 5 with the intermediate section 2 so as to allow the side sections to move pivotally independently of movement of the middle or intermediate section or of movement of each other to allow the planter to adapt itself to undulations in the ground over which it is traveling. The central or intermediate section 2 of the frame is provided with a pair of longitudinally extending brace bars 6 and 7 which have bearings 8 attached thereto and depending therefrom substantially equi-distant of their ends. Suitable longitudinally extending braces 9 are carried by each of the side sections 3 and 4 of the frame and these braces together with the outer side rails of the side frames have bearings 10 attached thereto and depending therefrom. The bearings 8 and 10 rotatably support the main drive axle 11 of the planter structure which is made in three sections, comprising an intermediate section 12 and end sections 13 and 14 which are connected to the intermediate section by universal joints 15 to allow of movement of the end sections of the axle with the movement of the side sections of the frame.

The axle sections 12, 13 and 14 have land rollers 17 mounted thereon which form supporting wheels for the planter structure and which are also positioned directly in front of the seed dispensing mechanisms which will be hereinafter more fully described.

The longitudinally extending brace bars 6 and 7 have a pair of bars 18 pivotally connected thereto short distances in the rear of the main axle 11 of the planter structure. These bars have their rear ends bent downwardly as shown at 19 so that the main portion thereof will be spaced upwardly from the main supporting frame 1 of the planter as clearly shown in Fig. 2 of the drawings, a draft tongue 20 of the usual construction is connected to a short bar 21 which is attached to the forward ends of the bars 18. A ground engaging wheel 22 is swivelly supported by the cross bar 21. The auxiliary frame is connected to the main supporting frame in the rear of the supporting axle with a view of having the said auxiliary frame and the parts directly connected thereto act as little as possible upon the front part of the main supporting frame, the weight of said auxiliary frame and the upward pressure exerted upon the front part thereof while the frame is moving over the ground having a tendency to depress the rear part of the planter, and the operating means connected thereto.

An ordinary seat structure may be provided, which is supported by the bars 18.

Positioned beneath the front end of the frame 1 of the planter are a plurality of harrow structures or land stirring means indicated by the numeral 23. These harrow structures are composed of sections 24 which have their meeting ends pivotally connected as as 25 to allow of limited movement of one section independently of the other. Each of the sections of the harrow structure have the usual type of pulverizing or stirring teeth 26 carried thereby which will stir the ground and break up clods, to a large extent during the operation of the planter.

The harrow sections have flexible chains 27 connected thereto, which chains have their ends connected to the supporting frame as shown at 28 and pass about pulleys 29 carried by the harrow structure and also about pulleys 30 carried by the bars 18. The chains 27 are connected to a lever structure 31 so that upon the pivotal movement of the lever the elevation of the land pulverizing or stirring means 23 may be regulated as desired, or is made necessary by the conditions of the ground. A quadrant 32 is carried by the cross bar 33, to which the lever 31 is pivoted and a dog mechanism 34 is carried by the lever 31 for coaction with the quadrant to hold the lever in adjusted position.

Positioned rearwardly of the land rollers 17 are the furrow opening shoe structures which are attached to the supporting frame 1 in any suitable manner, such as by braces 35. The shoes 36 are flat and have their forward ends curved upwardly as shown at 37. Attached to the under surface of the shoes 36 near their rear ends are furrow openers 38 which are constructed to open the shallow narrow furrow or one substantially three-quarters of an inch deep and three-quarters of an inch wide into which the beet seeds are deposited, through the delivery spouts 39 from the dispensing mechanism generally indicated by the numeral 40.

Each dispensing mechanism 40 comprises a hopper 41 which has a central partition 42 mounted therein for dividing the hopper into a seed retaining chamber and a fertilizer retaining chamber. Plates 43 are attached to and spaced slightly from the lower end of the hopper 41 and this plate is provided with openings 44 through which the seed and fertilizer fall into the chute 39. In contact with the plates 43, beneath the lower delivery end of the hopper 41 is a dispensing plate 45 which dispensing plate is provided with a plurality of spaced openings 46. The openings 46 are spaced so that the seed will be deposited at predetermined intervals and the sides of the openings diverge as they extend downwardly so that the portions of the openings which are opened through the lower surface of the disk are larger than the entrances of the openings so as to insure the falling of the seeds and fertilizers therethrough. The disks 46 are carried by shafts 47 upon the lower ends of which are mounted beveled gears 48. The beveled gears 48 mesh with beveled gears 49 for rotating shafts 47 and consequently the disk 45. During the rotation of the disk 45, the openings 46 will first be filled with fertilizer and as the openings pass over the spout 39 the fertilizer will drop out of the openings into the spout and at the same time the openings will be filled with beet seed which will also fall through the openings into the spout and down through the spout with the fertilizer into the furrow formed by the furrow opening shoe 38.

The beveled gears 49 which mesh with the beveled gear 48 and operate the seed dispensing plate of the intermediate planter structure are mounted upon a shaft 50 which is slidably supported by suitable bearings 51. A sprocket 52 is mounted upon the shaft 50 and a sprocket chain 53 passes about this sprocket and about a sprocket 54 carried by the axle section 12 for rotating the shaft 50 by the rotation of the axle. The beveled gear 49 which operates the seed dispensing plate of the dispensing mechanism carried by the section 3 of the planter is mounted upon a shaft 55. The shaft 55 is supported by suitable bearings 56 and it has a sprocket 57 mounted thereupon which is connected to a sprocket 58 carried by the shaft sections 13 through the medium of a sprocket chain 59. The shaft 60 which carries the beveled gear 49 that controls the operation of the seed dispensing mechanism carried by the frame sections 4 is operatively connected to the axle section 14 through the medium of sprockets 61 and 62 and a sprocket chain 63.

The shaft 60 is rotatably and slidably supported by suitable bearings 64 and the shaft 55 is rotatably and slidably carried by the bearings 56.

A hand lever 66 is pivotally supported at 67 by the rear end of the intermediate section 2 of the frame 1 and it has its lower end connected to the shaft 50 for shifting this shaft to move the gears 49 out of meshing engagement with the beveled gear 48 when it is desired to arrest the operation of the planter section and to shift the shaft to move the beveled gear 49 into meshing engagement with the beveled gear 48 when it is desired to operate the planter structure. A rod 68 is connected to the lever 66 above its pivot and to a pivotally mounted lever 69. The pivotally mounted lever 69 is in turn connected to the shaft 55 for shifting the shaft 55 upon pivotal movement of the lever 66 for moving the beveled gear into or out of meshing engagement with the beveled gear 48. A second rod 70 is connected to the lever 66 above its pivot and to a pivotally mounted arm 71. The arm 71 is connected to the shaft 60 for shifting this shaft to move the beveled gear 49 carried thereby into or out of meshing engagement with its companion beveled gear 48 upon the pivotal movement of the lever 66. It will thus be seen that by pivotal movement of the lever 66 the operation of all of the seed dispensing or planting mechanism may be controlled.

Suitable shafts 72 are carried by the hopper structure 40 and they have agitators 73 mounted thereon which agitators are positioned within the compartment of the hopper for agitating and stirring the seed and fertilizer positioned within the compartment. The shafts 72 are rotated by the shafts 50, 55 and 60 through the medium of sprockets and sprocket chain connections.

Scrapers 74 are carried by the respective frame section and engage the periphery of the rollers 17 for preventing the accumulation of soil thereon.

While in the foregoing description, the device has been described as a planter for planting sugar beet seed, it is to be understood that by changing the seed dispensing disk or plate, any type of seed may be planted by the planter without departing from the spirit of the invention.

Summing up, generically the operation of the improved planter is as follows: The ground or soil is first stirred by the harrow structure 23, after which the portion of the ground directly in front of the planter structure is rolled by the roller structure 17 which crushes all the clods and prepares the seed bed. The furrow openers 38 will open a shallow narrow furrow in the rolled ground and the seed and fertilizer will be deposited at spaced intervals, in this furrow as heretofore described. After the seed and fertilizer has been deposited in the furrow it will be covered by the covering wheels 80 which are rotatably supported by suitable supporting structure 81 directly in the rear of the spout 39.

From the foregoing description taken in connection with the accompanying drawing the advantages of construction and the method of operation of the improved planter will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a planter structure, a supporting frame including side sections and an intermediate section, said side sections pivotally connected to said intermediate section to allow limited movement of the side sections independently of the intermediate sections, an auxiliary supporting frame including side rails having their rear ends bent downwardly and attached to said intermediate frames directly to the rear of said supporting axle, and a tongue connected to said auxiliary supporting frame and planting means on these frame sections.

2. In a planter structure, a supporting frame including side sections and an intermediate section, said side sections pivotally connected to said intermediate section to allow limited movement of the side section independently of the intermediate sections, an auxiliary supporting frame including side rails having their rear ends bent downwardly and attached to said intermediate frames directly to the rear of said supporting axle, a tongue connected to said auxiliary supporting frame, seed planting means carried by each of said frame sections, and means operable by the rotation of said axle section for operating said seed planting means.

3. In a planter structure, a supporting frame, including an intermediate section, and side sections, pivotally connected to said intermediate sections to allow limited movement of said side sections independently of the intermediate sections, an auxiliary supporting frame, spaced upwardly from said intermediate section, and side rails on said auxiliary frame for connection with said intermediate section and planting means on these frame sections.

4. A planter structure, comprising the elements set forth in claim 1, and additionally a tongue connected to the free end of said auxiliary supporting frame, planting means carried by each of said frame sections, a supporting axle made in pivoted sections corresponding to the sections of the supporting frame, and means operable by the actuation of said axle sections for operating said planting means.

5. In a planter structure, a supporting intermediate frame section, supporting side sections, pivoted to said intermediate section, planting means carried by said sections, a supporting axle made in pivoted sections, and means connected to said planting means and to said axle sections for operating the planting means of each section independently of those of other sections.

6. In a planter structure, a supporting intermediate frame section, supporting side sections, pivotally secured to said intermediate section, planting means on said supporting sections, a supporting axle in pivoted sections corresponding to the sections of the supporting frame, an operating member for said planting means, and connecting and clutching means between said operating members and said planting means for operating the planting means of one section independently of those of other sections.

7. In a planter structure, a supporting frame, including side sections and an intermediate section, pivotally connected therewith, and land packing rollers on said sections, in combination with an auxiliary frame spaced above the intermediate section, harrows or land stirring plows, extending the entire width of the supporting frame.

8. In a planter structure, as set forth in claim 7, chains operably connected to and adapted to adjust the position of said plows, and connected to both the intermediate and the auxiliary frames.

9. In a planter structure in combination, a supporting frame having an intermediate section and side sections pivotally connected thereto, a supporting axle made in pivotally connected sections to correspond to the frame sections, an auxiliary frame, spaced above the intermediate supporting frame section and connected thereto at the rear of said supporting axle, land packing rollers on said sections, harrow or land stirring plows extending the entire width of the supporting frame and situated in front of said supporting axle, depth adjusting flexible means connected to said plows and to said intermediate and auxiliary frames.

10. In a planter structure in combination, an intermediate supporting frame section, supporting side frame sections pivotally connected thereto, land packing rollers and planting and dispensing means on the sections, adjustable pivotally connected sectional means constituting land stirring plows or harrows, extending the entire width of the supporting frame and in front of said land packing rollers, flat furrow opening or drilling means at the rear of said rollers, and furrow covering wheels at the rear of said drilling means.

11. In a planter structure, in combination, a supporting frame including an intermediate section and side sections pivotally connected to said intermediate section, supporting axes mounted upon said frame sections and intermediate the front and rear ends thereof and pivotally connected to those of the adjoining frame sections, an auxiliary supporting frame spaced upwardly from said intermediate section, and planting and soil treating means on the frame sections.

12. In a planter structure, in combination, a supporting frame including an intermediate section and side sections pivotally connected to said intermediate section so as to be capable of limited rocking movement, supporting axles mounted upon said frame section intermediate the front and rear ends thereof and pivotally connected to those of the adjoining frame sections, an auxiliary supporting frame spaced upwardly from said intermediate section, land rollers on said supporting axle section, and seed planting means at one end of said frame section, and soil loosening and treating means on the other end of said frame section, and means operably connecting said soil treating means to said auxiliary frame.

13. In a planter structure, in combination, a supporting frame including an intermediate section, and side sections pivotally connected to said intermediate section and capable of limited rocking movement, supporting axles mounted within said frame section and pivotally connected to the axles of the adjoining frame sections, an auxiliary supporting frame spaced upwardly from said intermediate section and land rollers on said supporting axles adapted to support the frame sections above the ground, seeding means at one end of said frame section, means intermediate said seeding means and the axles for pivotally connecting the intermediate frame section to the auxiliary frame, soil treating and loosening means at the other end of the frame section, and means on the auxiliary frame operably connected to said soil loosening means.

14. In a planter structure, a sectional frame including an intermediate section and side sections pivotally connected to said intermediate section, supporting axles mounted within said sectional frame intermediate the front and rear ends thereof pivotally connected to the supporting axles of the adjoining frame sections, an auxiliary supporting frame spaced upwardly from said intermediate section, and means intermediate the supporting axles and the end of the sectional frame and pivotally connecting said frame to the auxiliary frame, land rollers upon the supporting axles supporting the sectional frame above the ground, pivotally connected harrows supported below the other end of the sectional frame and means on the auxiliary frame operably connected to the harrows.

In testimony whereof I affix my signature in presence of two witnesses.

CHARLES M. PHILLIPS.

Witnesses:
F. N. HUMPHREY,
S. R. OSTRANDER.